US012802222B2

(12) United States Patent
Wang

(10) Patent No.: US 12,802,222 B2
(45) Date of Patent: Nov. 17, 2026

(54) IMAGE PROCESSING SYSTEM FOR ORGAN-AT-RISK SEGMENTATION

(71) Applicant: Ever Fortune.AI CO., Ltd., Taichung City (TW)

(72) Inventor: Ti-Hao Wang, Taichung City (TW)

(73) Assignee: EVER FORTUNE.AI CO., LTD., Taichung City (TW)

( * ) Notice: Subject to any disclaimer, the term of this patent is extended or adjusted under 35 U.S.C. 154(b) by 149 days.

(21) Appl. No.: 19/022,896

(22) Filed: Jan. 15, 2025

(65) Prior Publication Data

US 2025/0299328 A1 Sep. 25, 2025

Related U.S. Application Data

(60) Provisional application No. 63/567,526, filed on Mar. 20, 2024.

(30) Foreign Application Priority Data

Mar. 26, 2024 (TW) ................................ 113203045

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10081* (2013.01); *G06T 2207/10088* (2013.01); *G06T 2207/10104* (2013.01)

(58) Field of Classification Search
None
See application file for complete search history.

(56) References Cited

U.S. PATENT DOCUMENTS

| | | | | |
|---|---|---|---|---|
| 11,138,790 B2 * | 10/2021 | Haslam | G06F 18/24 |
| 11,540,811 B2 * | 1/2023 | Dufour | A61B 8/4254 |
| 11,551,420 B2 * | 1/2023 | Haslam | G06T 7/0014 |
| 11,715,210 B2 * | 8/2023 | Haslam | B33Y 50/00 |
| 11,801,114 B2 * | 10/2023 | Lang | A61B 5/113 |
| 11,922,631 B2 * | 3/2024 | Haslam | B33Y 50/00 |
| 12,277,712 B2 * | 4/2025 | Haslam | G06T 17/20 |
| 12,462,405 B2 * | 11/2025 | Vlasenkov | G06T 7/11 |
| 2011/0087088 A1 * | 4/2011 | Korn | A61B 5/053 600/411 |

(Continued)

*Primary Examiner* — Anand P Bhatnagar
(74) *Attorney, Agent, or Firm* — Birch, Stewart, Kolasch & Birch, LLP

(57) ABSTRACT

An image processing system for organ-at-risk segmentation includes a database, a data input module, a machine learning module, and an image processing module. The database stores medical images of organs. The machine learning module stores a machine learning algorithm that algorithmically generates a merging model, an extraction model, and a segmentation model for each organ based on the medical images of the organs. The data input module inputs data under test including at least two input medical images of different types. The image processing module merges the at least two input medical images to form a fused image based on the merging model, extracts at least one key feature of the fused image based on the extraction model, identifies the key feature extracted based on the segmentation model, and delineates contours of the organ corresponding to the key feature in the fused image based on the identification result.

9 Claims, 1 Drawing Sheet

(56) References Cited

U.S. PATENT DOCUMENTS

| | | | | |
|---|---|---|---|---|
| 2018/0330207 | A1* | 11/2018 | Zhou | G06T 7/0014 |
| 2021/0068790 | A1* | 3/2021 | Dufour | A61B 8/4254 |
| 2023/0169667 | A1* | 6/2023 | Vlasenkov | G06T 7/11<br>382/131 |
| 2024/0354940 | A1* | 10/2024 | Sjöstrand | G06T 7/0012 |

* cited by examiner

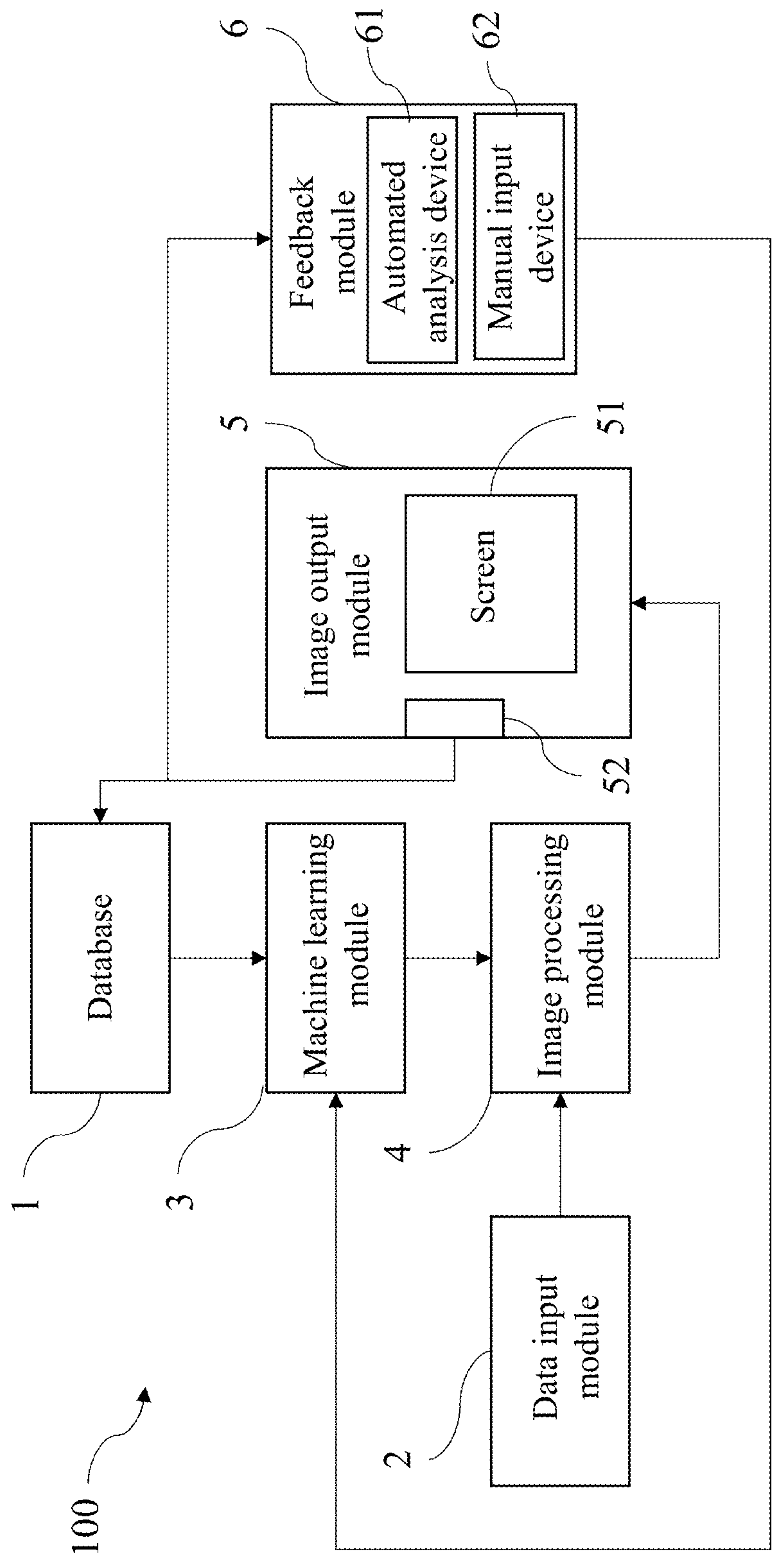
6
61
62
Feedback module
Automated analysis device
Manual input device
5
51
Image output module
Screen
52
Database
Machine learning module
Image processing module
1
3
4
Data input module
2
100

IMAGE PROCESSING SYSTEM FOR ORGAN-AT-RISK SEGMENTATION

CROSS REFERENCE TO RELATED APPLICATIONS

This non-provisional application claims the benefit under 35 U.S.C. § 119(e) to U.S. Provisional Application No. 63/567,526, filed on Mar. 20, 2024, and under 35 U.S.C. § 119(a) to Patent Application No. 113203045, filed in Taiwan on Mar. 26, 2024, all of which are hereby expressly incorporated by reference into the present application.

BACKGROUND OF THE INVENTION

Technical Field

The present invention relates generally to image processing, and more particularly to an image processing system that involves merging medical images of various types into a fused image, analyzing and judging the fused image, and then contouring relevant organs based on judgment results.

Description of Related Art

In radiotherapy, organ-at-risk segmentation is a crucial preparation. Traditionally, a radiologist relies on computed tomography (CT) images and delineation conditions along with personal experiences to manually assess and delineate a patient's organ at risk. However, the task is a huge workload and involves high image repetition, making the radiologist prone to decision fatigue under the high repetition of a large volume of images. The situation not only leads to low work efficiency, resulting in slow and inefficient medical operations, but also makes the manual delineation prone to errors due to fatigue or lack of experience, which may further lead to unnecessary human bias, thereby affecting the effectiveness of the radiotherapy.

To address the abovementioned issues associated with manual operation, an image processing system that performs automated judgement and segmentation for CT images is available on the market. Since the CT images are prone to artifacts affected by high atomic number metals and the CT images of complex anatomical structures have more noise, the image processing system based on CT image auto-segmentation has a tendency for low precision in judgment, along with low effectiveness and efficiency due to the artifacts or image complexity when predicting soft tissue organs. The shortcomings are particularly evident in the prediction of small organs on the CT images.

In view of the above, how to accurately and efficiently perform organ-at-risk image segmentation is an urgent issue.

BRIEF SUMMARY OF THE INVENTION

In view of the above, the first objective of the present invention is to provide an image processing system for organ-at-risk segmentation that merges various types of images into a fused image for interpretation, improving the shortcomings associated with relying solely on CT images, which could lead to misinterpretation.

The second objective of the present invention is to optimize images and organ segmentation by using a machine learning algorithm, making the operation of organ segmentation more accurate and efficient.

The present invention provides an image processing system for organ-at-risk segmentation, including a database, a data input module, a machine learning module, an image processing module, an image output module, and a feedback module. The database is configured to store a plurality of medical data and a plurality of medical images of a plurality of organs corresponding to the plurality of medical data, wherein a type of each medical image is one of a computed tomography (CT) image, a magnetic resonance imaging (MRI) image, and a positron emission tomography (PET) image. The machine learning module is signally connected to the database and stores a machine learning algorithm that algorithmically generates a merging model, an extraction model, and a segmentation model for each organ based on the plurality of medical data and the plurality of medical images of each organ corresponding to the medical data. The data input module is configured to input data under test that includes at least two input medical images, wherein a type of each input medical image is one of a CT image type, an MRI image type, and a PET image type, and the types of the at least two input medical images are different. The image processing module, signally connected to the machine learning module and the data input module, is configured to merge the at least two input medical images to form a fused image based on the merging model, computationally analyze and extract at least one key feature of the fused image based on the extraction model, computationally analyze and identify the at least one key feature extracted based on the segmentation model to obtain an identification result accordingly, and utilize the identification result, along with a location and a block of the at least one key feature in the fused image, to delineate contours of the organ corresponding to the at least one key feature in the fused image, and the image processing module generates a segmentation image accordingly. The image output module is signally connected to the image processing module for outputting the segmentation image.

According to the above aspect, the image processing system further includes a feedback module signally connected to the machine learning module for generating at least one feedback information. The machine learning module, after receiving the feedback information, algorithmically regenerates the extraction model and the segmentation model for each organ based on the feedback information.

According to the above aspect, the feedback module is further signally connected to the image output module to analyze the accuracy of the organ delineated in the segmentation image based on an assessment model, and the feedback module generates the feedback information based on an analysis result of the assessment model.

According to the above aspect, the feedback module has a manual input device configured for a user to manually input the feedback information corresponding to the segmentation image after manual analysis.

According to the above aspect, the machine learning algorithm of the machine learning module further algorithmically generates an image optimization model based on the plurality of medical images. The image processing module registers the at least two input medical images, then computationally adjusts each of the input medical images based on the image optimization model, and subsequently the at least two input medical images adjusted are merged to form the fused image.

According to the above aspect, the image optimization model is provided with a plurality of adjusting parameter sets for the CT image type, the MRI image type, and the PET image type, respectively, each adjusting parameter set including an intensity normalization parameter, a spatial normalization parameter, and a denoising algorithm parameter. The machine learning algorithm of the machine learning module adjusts each input medical image based on one corresponding adjusting parameter set for the type of each input medical image.

According to the above aspect, the fused image is a 3D image. The extraction model performs 2D layering for the fused image to form a plurality of 2D image layers, and then computationally analyzes and extracts the at least one key feature for each of the 2D image layers.

According to the abovementioned, the segmentation image is a 3D image and the contours of the organ delineated in the segmentation image are 3D contours.

According to the abovementioned, the image output module is further signally connected to the database for outputting the segmentation image and a segmentation result to the database for storage.

With the aforementioned design, the invention improves the shortcomings associated with relying solely on CT images, which could lead to misinterpretation. Additionally, the optimization of image and organ segmentation through the machine learning algorithm increases the accuracy and efficiency of the organ segmentation process.

BRIEF DESCRIPTION OF THE SEVERAL VIEWS OF THE DRAWINGS

The present invention will be best understood by referring to the following detailed description of some illustrative embodiments in conjunction with the accompanying drawings, in which FIG. 1 is a block diagram of an image processing system for organ-at-risk segmentation according to the present invention.

DETAILED DESCRIPTION OF THE INVENTION

An image processing system 100 for organ-at-risk segmentation according to a preferred embodiment of the present invention is illustrated in FIG. 1, wherein the image processing system 100 for organ-at-risk segmentation includes a database 1, a data input module 2, a machine learning module 3, an image processing module 4, an image output module 5, and a feedback module 6.

The database 1 is provided in a medical facility (e.g., a clinic, a hospital, or a medical center) and is configured to store a plurality of historical or new medical data of the medical facility as well as a plurality of medical images of a plurality of organs that correspond to the medical data, wherein a type of each medical image is one of a computed tomography (CT) image type, a magnetic resonance imaging (MRI) image type, and a positron emission tomography (PET) image type. In addition to storing medical data and medical images of a single medical facility, the database 1 could also establish data connections with relevant medical record storage centers of multiple medical facilities, integrating a plurality of medical data and medical images from multiple medical facilities to create a more diverse foundational dataset for subsequent applications.

The data input module 2 is configured to input data under test for organ segmentation. The data under test includes a plurality of input medical images, and the number of the input medical images could be at least two. A type of each input medical image is one of a CT image type, an MRI image type, and a PET image type, and the types of the at least two input medical images are different. For example, the data input module 2 could be a radiotherapist's or analyst's computer for establishing data connections with a server or a device used to generate or store CT images, MRI images, and PET images in the medical facility, so that the radiotherapist or the analyst could select medical images needed and input the medical images needed into the image processing system 100 for organ-at-risk segmentation to form the plurality of input medical images.

The machine learning module 3 is signally connected to the database and stores a machine learning algorithm. After the machine learning algorithm is trained based on the plurality of medical data and the plurality of medical images of each organ corresponding to the medical data, the machine learning algorithm algorithmically generates a merging model, an extraction model, and a segmentation model for each organ. The machine learning algorithm further algorithmically generates an image optimization model based on the plurality of medical images.

The image processing module 4 is signally connected to the machine learning module 3 and the data input module 2. The image processing module 4 registers the plurality of input medical images included in the data under test, then computationally adjusts each of the input medical images based on the image optimization model, and subsequently the plurality of input medical images adjusted are merged to form a fused image based on the merging model. After that, the image processing module 4 computationally analyzes and extracts one or more key features of the fused image based on the extraction model, and computationally analyzes and identifies the one or more key features extracted based on the segmentation model to obtain an identification result accordingly. Finally, the image processing module 4 utilizes the identification result, along with locations and blocks of the one or more key features in the fused image, to delineate (also known as segment) contours of the organ corresponding to the one or more key features in the fused image, and generates a segmentation image accordingly.

More specifically, in the present invention, during the training phase of the machine learning module 3, the machine learning algorithm could divide the medical data acquired and the plurality of medical images of each organ that correspond to the medical data into a training set and a testing set in a ratio of 8:2 (or other ratios such as 7:3 or 9:1) based on the size of data. After that, a residual network introduced with a channel attention mechanism, known as Attention_ResUnet, is utilized with the following properties. First, a residual module is added to the original convolutional module, making the gradient easier to propagate during the backpropagation and making the network easier to optimize. Second, in the present invention, on the basis of the residual module, the channel attention mechanism is introduced, which gradually assigns different weights to different channels through the backpropagation, thereby modeling the correlation between the channels by using spatial information of relevant locations, making the network to converge faster. Third, since the data in the present invention is a 3D data block, in order to enable the network to learn continuous features in a 3D target area, the first feature extraction layer of the network is configured as a 3D convolutional layer while the rest thereof are 2D residual layers. Since the output channels of the machine learning algorithm in the present invention are multiple channels, the Dice similarity coefficient for each channel needs to be assigned different weights, which are set between 0.3 and 0.7 for each channel in the present invention. Weighted random sampling could be used for data loading to ensure the data balance during the training process. The loss is gradually backpropagated to the neural network based on the networks, the loss function and the training method in the present invention, and the parameters of the neural network are optimized continuously, and the above training process is repeated consistently. During the training process, the learning ability of the network is evaluated based on the loss function of the testing set. The training could be stopped when the loss function of the testing set is minimized and remains stable, and then the merging model, the extraction model, and the segmentation model for each organ are algorithmically generated.

The image optimization model is provided with a plurality of adjusting parameter sets for the CT image type, the MRI image type, and the PET image type, respectively. Each adjusting parameter set is unique for each image type and includes an intensity normalization parameter, a spatial normalization parameter, and a denoising algorithm parameter. The machine learning algorithm of the machine learning module adjusts each input medical image based on one corresponding adjusting parameter set for the type of each input medical image. More specifically, the intensity normalization parameter is applied to standardize the brightness and contrast of the plurality of input medical images, eliminating variations caused by different imaging devices. Next, the spatial normalization parameter standardizes the consistency of the input medical images, making the subsequent modeling work effectively across different images. In addition, the denoising algorithm parameter is applied to reduce random noise in the input medical images while preserving important details of structures of the organ, improving the accuracy of subsequent modeling.

To achieve the image merging of various types of the input medical images included in the data under test, the merging model involves registering multiple images through two deep learning-based model architectures (multimodal fusion network architecture and multimodal metric learning architecture in the current embodiment). The multimodal metric learning architecture aims to learn the shared characteristics across multiple data modalities, such as images, audio, and text, in a feature space, and the core thereof lies in mining a metric or distance function that could evaluate the similarity among data points across various modalities. In this way, even though feature representations of data are different from each other, the multimodal metric learning could utilize deep neural network (DNN) to learn the feature representations across various modalities. The multimodal metric learning is trained to minimize the distance between the feature representations of the same sample across various modalities while increasing the distance between samples of different types. The multimodal fusion network architecture is then used to fuse relevant image contents. The training process usually employs a contrastive loss function to motivate similar samples to be closer and non-similar samples to be farther away, and the merging model training-generated is then used to output a 3D fused image to be delineated. In this way, the fused image could have multiple image sources corresponding to the one or more key features for each organ.

The extraction model performs 2D layering, which is used for the fused image to form a plurality of 2D image layers, and then extracts the one or more key features describing structures of each organ, such as texture, shapes, strength, etc., for each of the 2D image layers. The features are selected based on the contribution thereof to the performance of the contour segmentation model and are optimized during the training phase of the abovementioned deep learning technology, ensuring that the final feature set adequately represents the unique characteristics of the target organ. And, the convolutional neural network is used to predict the location and shape of organ-at-risk. In the current embodiment, the extraction model integrates multiple specialized neural networks for tumor contour segmentation in CT images, MRT images, and PET images, along with a network focused on multimodal similarity metric learning. The networks share weights at the convolutional layer. By jointly optimizing the training error of both the contour segmentation network and the multimodal similarity network, the feature learning processes for the multiple modalities are mutually facilitated, extracting unified and clearly distinguishable key features for each organ. Furthermore, the design for the multimodal similarity metric learning decreases the dependence of the algorithm on precise image registration and increases the flexibility and robustness of the application thereof.

The segmentation model employs the deep learning models specially designed for organ segmentation task training, such as convolutional neural network (CNN) or deformable convolutional network (DCN), to utilize the identification result, along with locations and blocks of the one or more key features, to precisely delineate contours for the organ at risk mainly from the fused image. In other words, the segmentation model is trained to identify and learn complex shapes and structure patterns of organs, thereby achieving highly precise and reliable contour segmentation results across various clinical scenarios. Additionally, the fused image after contour segmentation could be further refined and optimized through postprocessing techniques to output a segmentation image with more precision. The postprocessing techniques include smoothing boundaries of organs and employing region growing algorithms to enhance connected components, thereby increasing the accuracy of contour segmentation. And, artifact identification and removal techniques are utilized to further improve the precision of contour segmentation results.

The image output module 5 is signally connected to the image processing module 4 and the database 1, in which the image output module 5 is mainly for displaying and outputting the segmentation image. In the current embodiment, the image output module 5 includes a screen 51 and an output port 52. The screen 51 is configured to display the segmentation image after completing segmentation. The segmentation image is a 3D image and the contours of the organ delineated in the segmentation image are 3D contours. In this way, the radiotherapist could inspect the contour segmentation image delineated of the organ displayed on the screen 51 to precisely evaluate the effects and risks of subsequent radiotherapy. The output port 52 is configured to output the segmentation image and the segmentation result to the database 1 for storage, thereby increasing the number of foundational datasets and foundational parameters available for subsequent comparisons and increasing the accuracy for future segmentation.

The feedback module 6 signally connected to the machine learning module 3 and the image output module 5 is mainly for generating at least one feedback information to the machine learning module 3. More specifically, the feedback module 6 includes an automated analysis device 61 and a manual input device 62. The automated analysis device 61 is configured to receive the segmentation image and the segmentation result output by the output port 52 to analyze the accuracy of the organ delineated in the segmentation image based on an assessment model and generate the feedback information based on an analysis result of the assessment model. In the current embodiment, the assessment model employs a series of quantitative indicators for assessment, such as Dice similarity coefficient (DSC), Hausdorff Distance (HD) or sensitivity analysis, and then generates the feedback information to the machine learning module accordingly based on the assessment results. The manual input device 62 is configured for the user (e.g., the radiotherapist) to manually input the feedback information corresponding to the segmentation image based on the correctness and accuracy of the segmentation result after manual analysis. In this way, the machine learning module 3 could algorithmically regenerate the extraction model and the segmentation model for each organ based on the feedback information after receiving the feedback information, improving the accuracy for future segmentation.

As can be seen from the above, the image processing system 100 for organ-at-risk segmentation according to the present invention merges a plurality of input medical images of various types as the basis for subsequent judgment. The invention improves the shortcomings associated with relying solely on CT images, which could lead to misinterpretation. Additionally, the optimization of image and organ segmentation through the machine learning algorithm increases the accuracy and efficiency of the organ segmentation process.

It must be pointed out that the embodiments described above are only some preferred embodiments of the present invention. All equivalent structures which employ the concepts disclosed in this specification and the appended claims should fall within the scope of the present invention.

What is claimed is:

1. An image processing system for organ-at-risk segmentation, comprising:
- a database, configured to store a plurality of medical data and a plurality of medical images of a plurality of organs corresponding to the plurality of medical data, wherein a type of each medical image is one of a computed tomography (CT) image type, a magnetic resonance imaging (MRI) image type, and a positron emission tomography (PET) image type;
- a machine learning module, signally connected to the database and storing a machine learning algorithm that algorithmically generates a merging model, an extraction model, and a segmentation model for each organ based on the plurality of medical data and the plurality of medical images of each organ corresponding to the medical data;
- a data input module, configured to input data under test that includes at least two input medical images, wherein a type of each input medical image is one of the CT image type, the MRI image type, and the PET image type, and the types of the at least two input medical images are different;
- an image processing module, signally connected to the machine learning module and the data input module, configured to:
- merge the at least two input medical images to form a fused image based on the merging model,
- computationally analyze and extract at least one key feature of the fused image based on the extraction model,
- computationally analyze and identify the at least one key feature extracted based on the segmentation model to obtain an identification result accordingly,
- utilize the identification result, along with a location and a block of the at least one key feature in the fused image, to delineate contours of the organ corresponding to the at least one key feature in the fused image, and generate a segmentation image accordingly;
- an image output module, signally connected to the image processing module for outputting the segmentation image.

2. The image processing system as claimed in claim 1, further comprising a feedback module signally connected to the machine learning module for generating at least one feedback information; the machine learning module, after receiving the feedback information, algorithmically regenerating the extraction model and the segmentation model for each organ based on the feedback information.

3. The image processing system as claimed in claim 2, wherein the feedback module is further signally connected to the image output module to analyze the accuracy of the organ delineated in the segmentation image based on an assessment model, and the feedback module generates the feedback information based on an analysis result of the assessment model.

4. The image processing system as claimed in claim 2, wherein the feedback module has a manual input device configured for a user to manually input the feedback information corresponding to the segmentation image after manual analysis.

5. The image processing system as claimed in claim 1, wherein the machine learning algorithm of the machine learning module further algorithmically generates an image optimization model based on the plurality of medical images; the image processing module registers the at least two input medical images, then computationally adjusts each of the input medical images based on the image optimization model, and subsequently the at least two input medical images adjusted are merged to form the fused image.

6. The image processing system as claimed in claim 5, wherein the image optimization model is provided with a plurality of adjusting parameter sets for the CT image type, the MRI image type, and the PET image type, respectively, each adjusting parameter set including an intensity normalization parameter, a spatial normalization parameter, and a denoising algorithm parameter; the machine learning algorithm of the machine learning module adjusts each input medical image based on one corresponding adjusting parameter set for the type of each input medical image.

7. The image processing system as claimed in claim 1, wherein the fused image is a 3D image; the extraction model performs 2D layering for the fused image to form a plurality of 2D image layers, and then computationally analyzes and extracts the at least one key feature for each of the 2D image layers.

8. The image processing system as claimed in claim 1, wherein the segmentation image is a 3D image and the contours of the organ delineated in the segmentation image are 3D contours.

9. The image processing system as claimed in claim 1, wherein the image output module is further signally connected to the database for outputting the segmentation image and a segmentation result to the database for storage.

* * * * *